US009443076B2

(12) United States Patent
Vayvod et al.

(10) Patent No.: US 9,443,076 B2
(45) Date of Patent: Sep. 13, 2016

(54) PROTECTION OF USER APPLICATION SETTING FROM THIRD PARTY CHANGES

(71) Applicant: Google Inc., Mountain View, CA (US)

(72) Inventors: Anton Viktorovich Vayvod, London (GB); Dmitry Yurievich Polukhin, Moscow (RU); Ivan Andreyevich Korotkov, Moscow (RU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/420,200

(22) PCT Filed: Oct. 1, 2012

(86) PCT No.: PCT/RU2012/000795
§ 371 (c)(1),
(2) Date: Feb. 6, 2015

(87) PCT Pub. No.: WO2014/025283
PCT Pub. Date: Feb. 13, 2014

(65) Prior Publication Data
US 2015/0205950 A1  Jul. 23, 2015

(30) Foreign Application Priority Data
Aug. 7, 2012 (RU) .............................. 2012133986 U (51) Int. Cl.
*G06F 7/04* (2006.01)
*G06F 21/51* (2013.01)
*G06F 9/445* (2006.01)

(52) U.S. Cl.
CPC ........... *G06F 21/51* (2013.01); *G06F 9/44505* (2013.01); *G06F 2221/2119* (2013.01)

(58) Field of Classification Search
None
See application file for complete search history.

(56) References Cited

U.S. PATENT DOCUMENTS

| | | | |
|---|---|---|---|
| 7,051,327 B1 * | 5/2006 | Milius ....................... | G06F 8/65 717/168 |
| 8,671,279 B2 * | 3/2014 | Brouwer ................. | G06F 11/10 707/646 |
| 2008/0155509 A1 * | 6/2008 | Ohta ..................... | G06F 21/572 717/127 |

* cited by examiner

*Primary Examiner* — Brandon Hoffman
(74) *Attorney, Agent, or Firm* — McDermott Will & Emery LLP (57) ABSTRACT

Methods, systems, and apparatuses for protecting user settings of an application from third-party application changes are provided. An example method for protecting a user setting of an application from a third-party application change includes verifying a digital signature of a backup application setting, and determining whether a provided actual application setting matches the backup application setting when the digital signature of the backup application setting is verified. The example method further includes replacing the provided actual application setting with the backup application setting when the provided actual application setting is determined to not match the backup application setting. The example method also includes displaying, to a user, a document using the replaced actual application setting. The example method further includes displaying, to the user, an indication that the provided actual application setting has been changed when the provided actual application setting is determined to not match the backup application setting.

19 Claims, 7 Drawing Sheets

PROTECTION OF USER APPLICATION SETTING FROM THIRD PARTY CHANGES

BACKGROUND

1. Field

This disclosure generally relates to protection of user application settings from third-party changes.

2. Background

A user may download an application such as a web browser at a client device along with other applications. These other applications may be third-party applications that provide additional functionality to the web browser.

A web browser may be the most accessed application on the user's computer and may include user application settings. During installation, the third-party application may change one or more web browser settings. The third-party application may provide opt-out options to the user, but the user may not notice the opt-out options. This may be because the opt-out options are located deep within the installation wizard screens.

An example browser setting may identify a search engine to use. If the third-party application changes the browser setting to identify another search engine, the user may use the other search engine without noticing. Or the user may be confused because the setting has changed, and the user does not know how to revert back to the original setting. This may also be a security issue because the new "search engine" may display fake search results, and fake auto-completion results may lead to phishing sites.

Further, the third-party application may delete the original setting, and thus uninstallation of the third-party application may not revert the new setting to the original setting. These problems may degrade the user's experience.

BRIEF SUMMARY

Embodiments include providing an indication to a user that a user application setting has been changed.

An example method for protecting one or more user settings of an application from third-party application changes includes verifying a digital signature of a backup application setting. It is determined whether a provided actual application setting matches the backup application setting when the digital signature of the backup application setting is verified. The provided actual application setting is replaced with the backup application setting when the provided actual application setting is determined to not match the backup application setting. A document is displayed using the replaced actual application setting to a user via a user interface. An indication that the provided actual application setting has been changed is displayed to the user via the user interface when the provided actual application setting is determined to not match the backup application setting.

An example method for protecting one or more user settings of an application from third-party application changes includes monitoring one or more user application settings for a change. A change to a user application setting is detected based on the monitoring. It is determined whether a process internal to the application made the change to the user application setting. The user application setting is updated based on the change when the process that made the change is determined to be internal to the application. An indication, via a user interface, that the user application setting has been changed is displayed when the process that made the change is determined to not be internal to the application.

Other embodiments include corresponding systems, apparatuses, and computer program products configured to perform the actions of these methods, encoded on computer storage devices.

Further embodiments, features, and advantages as well as the structure and operation of the various embodiments are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architectures
   A. Compare Actual Application Settings to Backup Application Settings
      1. Sign and Verify Backup Application Settings
      2. Digital Signatures
      3. User Notification
   B. Example Screenshots
   C. External Tracking Process
III. Example Process Flow Diagrams
IV. Example Computer Embodiment I. Overview Embodiments generally relate to protecting a user application setting from a third-party application change by providing a comparison to a backup application setting.

In an example, the user may install a web browser and a third-party application. During installation, the third-party application may change the user's browser settings. Examples of user browser settings that may change are the default search engine and startup pages (e.g., homepage and pinned tabs). Often if a change occurs, the user may be notified of the change and be given an opportunity to accept or reject the change. This may confirm the intent of the user in changing the setting.

A web application may include user application settings. The web application may be configured to protect one or more web application settings from being changed by a third-party application. When the web application starts up, an actual application setting may be provided to the web application. A backup copy of one or more user application settings may also be maintained. The backup application setting may be signed with a digital signature to validate the backup application setting.

In an embodiment, a digital signature of a backup application setting is verified, and it is determined whether a provided actual application setting matches the verified backup application setting. If the provided actual application setting does not match the backup application setting, the actual application setting has been changed. The provided actual application setting is replaced with the backup application setting when the provided actual application setting is determined to not match the backup application setting. A document is displayed to a user via a user interface using the replaced application setting. An indication is displayed to the user via the user interface that the provided actual application setting has been changed when the provided actual application setting is determined to not match the backup application setting. In this way, the user may be informed of application setting changes.

In an embodiment, one or more user application settings is monitored for a change. A change to a user application setting is detected based on the monitoring, and it is determined whether a process internal to the application made the change to the user application setting. The user application setting is updated based on the change when the process that made the change is determined to be internal to the application. An indication is displayed, via a user interface, that the user application setting has been changed when the process that made the change is determined to not be internal to the application. In this way, the user may be informed of application setting changes. Such monitoring may be performed by the application itself, or the monitoring may be performed by a process external to the application.

For convenience, this disclosure refers to protecting user settings of a web application. It should be understood, however, that user settings of other applications may also be protected and may benefit from the techniques provided in this disclosure. Further, the protection of user application settings may be extended to extensions of the application (e.g., browser extensions).

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate example embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which the specification would be of significant utility. Therefore, the detailed description is not meant to limit the embodiments described below.

II. Example System Architectures

A. Compare Actual Application Settings to Backup Application Settings

Figure 1:
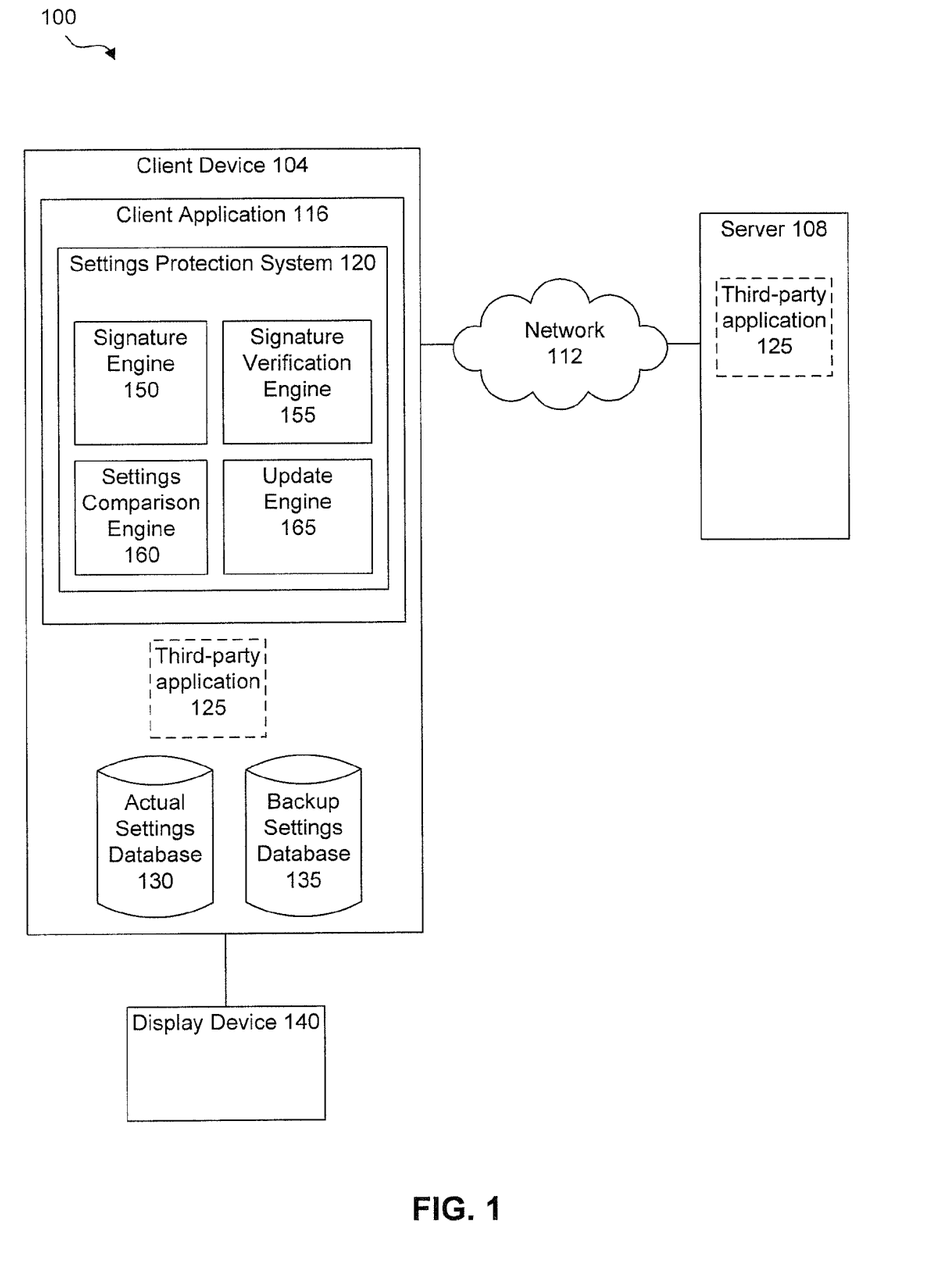
FIG. 1 is a diagram illustrating a system for protecting a user application setting from a change by a third-party application, according to an embodiment.

FIG. 1 is a diagram illustrating a system 100 for protecting a user application setting from a change by a third-party application, according to an embodiment.

System 100 includes a client device 104 that is communicatively coupled to a server 108 via a network 112. Although system 100 is described herein with reference to one client device and one server, one of skill in the art will recognize that system 100 may also include more than one client device and/or more than one server without departing from the spirit and scope of the present disclosure.

Client device 104 includes a client application 116. Client application 116 may be, for example, a browser. A browser is a software application that allows a user to view or download content that is available on a network, such as on a website on the World Wide Web. Content may include, for example and without limitation, text, files, images, audio, video and personal communications. Web pages present such content and are located using uniform resource identifiers (URI) such as a uniform resource locator (URL). A web page may be retrieved using the Internet Protocol (IP) address of the computer holding the web page content. A browser may use a number of protocols and standards to obtain or manage content flow. In an example, a browser uses Hypertext Transfer Protocol (HTTP) to fetch content and web pages. HTTP can be used for requesting and retrieving objects from a server.

Client device 104 also includes an actual settings database 130 and backup settings database 135. Actual settings database 130 stores one or more actual application settings of client application 116. These actual application settings may be provided to client application 116 when client application 116 is launched. For example, if a third-party application changes a setting of client application 116, the new setting will be the actual application setting that is provided to client application 116 when it is launched.

Backup settings database 135 stores a backup copy of one or more application settings of client application 116. An application setting that has a backup copy may be protected from being changed without user notification as described in further detail in this disclosure. A backup copy of a protected setting may be maintained and updated when a corresponding application setting change is approved. An example of an approved application setting change is when the user accepts the change to the application setting or when the process that changes the application setting is internal to the application. It will be understood that an application setting change may be approved under other circumstances. For example, an application setting change may be approved when an administrator in a local network changes the settings for the user.

The actual application settings and backup application settings may be stored differently from the embodiment shown in FIG. 1. In an embodiment, the backup application settings are stored in the same location in which the actual application settings are stored. In an example, a database stores user application settings such as the default search engine and the backup copy for the default search engine, and a plaintext preferences file includes other application settings such as the startup pages and the backup copy for the startup pages. Accordingly, the plaintext preferences file may include both the actual application settings and the corresponding backup application settings. In an example, the homepage is a preference setting stored in a file such as a JavaScript Object Notation (JSON) file in the user profile directory. A preferences file may include a "backup" dictionary with fields indicating, for example, the homepage, pinned tabs, and URLs to restore on startup. These fields may contain the copies of the original values.

In an embodiment, client application 116 keeps a copy of the backup application settings in memory, and the background application settings cannot be changed from outside of client application 116 while the user is using the application. Client application 116 may use the same copy in memory to update the backup application settings, and client application 116 may override the application settings. Accordingly, in this implementation, backup application settings may be changed only while client application 116 is not running.

Server 108 includes a third-party application 125 that a user may download via client application 116. For example, third-party application 125 may be downloaded from server 108 and run on client device 104. Third-party application 125 may change the application settings of client application 116 unbeknownst to the user. In an example, client application 116 is a browser and a search engine toolbar different from the user's default search engine may be installed during installation of third-party application 125, and the default search engine may change. It may be desirable to inform the user of this change to avoid confusion.

Client application 116 includes a settings protection system 120 that protects one or more user settings of an application from third-party application changes without user notification. A user application setting may be protected from third-party changes to reduce the confusion a user may have when the user's settings are changed without user notification. If a user application setting has changed, settings protection system 120 may then provide an option to the user to accept or reject the change. In this way, an intention of the user may be determined. For example, if the user does not want the change to take place, the user may reject the application setting change. If, however, the user does want the change to take place, the user may accept the application setting change.

Settings protection system 120 includes a signature engine 150, signature verification engine 155, settings comparison engine 160, and update engine 165. In the embodiment shown in FIG. 1, settings protection system 120 is implemented within (e.g., native to) client application 116. In another embodiment, settings protection system 120 may be coupled to client application 116, such as a plug-in that adds functionality to client application 116.

1. Sign and Verify Backup Application Settings

Third-party application 125 may install a false backup application setting so that when the provided actual application setting is compared to the false backup application setting, the provided actual application setting matches the false backup application setting. Accordingly, third-party application 125 may change the user's application setting without user notification. To circumvent third-party application 125 from installing a false backup application setting that matches the provided actual application setting, the legitimate backup application setting may be signed with a hash function. The signature for the backup application setting may help determine whether the backup application setting is valid.

Each backup application setting may have its own signature. In an embodiment, signature engine 150 generates a digital signature for a backup application setting. Signature engine 150 may store the digital signature in backup settings database 135 or in a different database.

Signature verification engine 155 verifies a digital signature of a backup application setting. Signature verification engine 155 generates a new digital signature for the backup application setting and identifies the existing digital signature generated by signature engine 150. Signature verification engine 155 determines whether the new digital signature generated by signature verification engine 155 matches the existing digital signature generated by signature engine 150.

If the new digital signature is determined to match the existing digital signature, the digital signature of the backup application setting is verified.

If, however, the new digital signature is determined to not match the existing digital signature, the digital signature of the backup application setting is not verified. If the digital signature of the backup application setting is not verified, the backup application setting and/or the digital signature for the backup application setting has been tampered with by, for example, third-party application 125. Accordingly, the backup application setting is considered invalid.

If the digital signature of the backup application setting is not verified, update engine 165 may reset the backup application setting to a default application setting. Update engine 165 may then inform the user of this change. Client application 116 may display, to the user via the user interface, an indication that the backup application setting and corresponding application setting may have been tampered with. Client application 116 may enable the user to accept the default application setting or to manually restore the backup application setting. If the backup application settings have been lost, a link to a webpage that enables the user to change the settings may be provided to the user.

The backup application settings may be partitioned into two or more pieces and stored at different locations. In an example, a part of the backup application settings is stored in a text file, another part of the backup application settings is stored in a database, and each part of the backup application settings has its own signature that is checked independently. The backup application settings may be checked once.

In an example, the backup application setting may identify a homepage. When the user launches client application 116, the application setting associated with the startup pages are accessed. Before the startup pages are processed and opened, signature verification engine 155 verifies the signature of the backup application setting that identifies the homepage.

In another example, the backup application setting may identify a default search engine. When the user performs an action that accesses the search engine (e.g., the user first starts typing into the address bar or search box (e.g., the omnibox) or opens the search engine settings), the application setting associated with the default search engine is accessed. The search engine is loaded from the database and the signature for that backup application setting is verified to determine whether it is valid.

The digital signature for the backup application setting may prevent third-party application 125 from duplicating or overriding the backup application setting. For example, if a user downloads and installs third-party software and client application 116 is restarted or has crashed, the application settings and backup applications settings are rewritten without signatures so that the verification fails. Alternatively, if third-party application 125 generates and stores a digital signature for a backup application setting, the digital signature generated by third-party application 125 would not match the digital signature generated by signature verification engine 155 when the signatures of the backup application settings are compared. The user may see a notification on the next launch of client application 116 that the settings have changed.

2. Digital Signatures

In an example, signature engine 150 generates the digital signature by generating a Hash-based Message Authentication Code (HMAC) signature. HMAC is a digital signature scheme that employs a hashing algorithm and a secret key. The hashing algorithm may be, for example, Secure Hash Algorithm 256 (SHA256). The secret key may be stored in a binary in any form.

Signature verification engine 155 generates the new digital signature using HMAC and compares these two digital signatures to determine whether they match.

In the above example, signature engine 150 generates a digital signature by generating a Hash-based Message Authentication Code (HMAC) signature. Other algorithms may be used that are different from HMAC. For example, secure ID or digi-sign may be used to sign a backup application setting.

To further prevent third-party application 125 from copying the signature, signature engine 150 may salt the key with user-specific information. An example of user-specific information is the full contents of a table (e.g., a table that stores the backup application settings). The full contents of the table may be, for example, a listing of all of the user's search engines. The key base may be a string such as "These settings are not allowed to be modified by third-party applications" to make it clear that the settings should not be changed. If this option is implemented, the same key may also be used to obfuscate the settings.

In an example embodiment, a database includes tables "Keywords" and "Keywords_Backup" that store an application setting for a default search engine. The "Keywords_Backup" table may store the exact same data as the "Keywords" table and is updated every time the "Keywords" table is updated. Two keys are added to the key-value table meta: default search provider ID backup, which stores a copy of default search provider ID, and default search provider ID backup signature. A signature may be generated that includes default search provider ID backup and the full contents of the "Keywords_Backup" table.

In an embodiment, when the user performs, for the first time since the application has started, an action that accesses the application setting for the default search engine, such as starting to type in the omnibox or opening the search engine settings, a digital signature for the backup application setting is generated, and the digital signature, the existing digital signature default search provider ID backup signature, and the salt value (e.g., all other rows in the "Keywords" and "Keywords_Backup" table) are compared. If the digital signatures do not match, the backup is considered invalid and may indicate that either the digital signature or the backup application setting has been tampered with by, for example, third-party application 125. If the digital signatures match, default search provider ID backup and default search provider ID as well as the rows in the "Keywords" and "Keywords_Backup" tables are equal; if they are not equal, a malicious application may have tampered with the default search settings.

3. User Notification

If the digital signature of the backup application setting is verified, setting comparison engine 160 determines whether a provided actual application setting matches the backup application setting. In an example, setting comparison engine 160 compares a provided actual application setting with the corresponding backup application setting. Setting comparison engine 160 may identify an application setting change.

If the provided actual application setting is determined to not match the backup application setting, update engine 165 replaces the provided actual application setting with the backup application setting. In this way, user confusion may be avoided because the application will appear to the user to be using the application settings that the user previously used before they were changed. Accordingly, if third-party application 125 changes the user application setting without user intent, the user will not be confused with the new application settings set by third-party application 125.

Client application 116 displays, to a user via a user interface, a document using the replaced actual application setting. Client device 104 is coupled to a display device 140, and the document may be a web page that is displayed via display device 140. When client application 116 receives the web page, client application 116 can render the web page for a user via display device 140. Display device 140 can be, for example and without limitation, a liquid crystal display, a plasma display, a variable graphics array (VGA) display, a super VGA display, a cathode ray tube display, or other similar types of display devices. In an embodiment, display device 140 can be configured to display a graphical user interface (GUI) that provides an interface between a user and computer system 100 or an application running on computer system 100 (also referred to herein as a "system application").

In an embodiment, if the provided actual application setting is determined to not match the backup application setting, client application 116 displays, to the user via the user interface, an indication that the provided actual application setting has been changed. Client application 116 may enable the user to accept or reject the application setting change via the user interface.

If the user accepts the application setting change, the corresponding backup application setting is updated and re-signed. In an embodiment, if the user accepts the application setting, change update engine 165 reverts the replaced actual application setting to the provided application setting and updates the backup application setting to the reverted actual application setting. Update engine 165 may store the updated backup application setting in backup settings database 135. Signature engine 150 may generate an updated digital signature for the updated backup application setting and store the updated digital signature in backup settings database 135.

If the user rejects the application setting change, update engine 165 may maintain the backup application setting. Accordingly, the backup application setting is not changed, and client application 116 may operate under the backup application setting rather than the provided application setting. The replaced actual application setting is also maintained.

B. Example Screenshots

As discussed above, an application setting change may be identified and made aware to the user.

Figure 2:
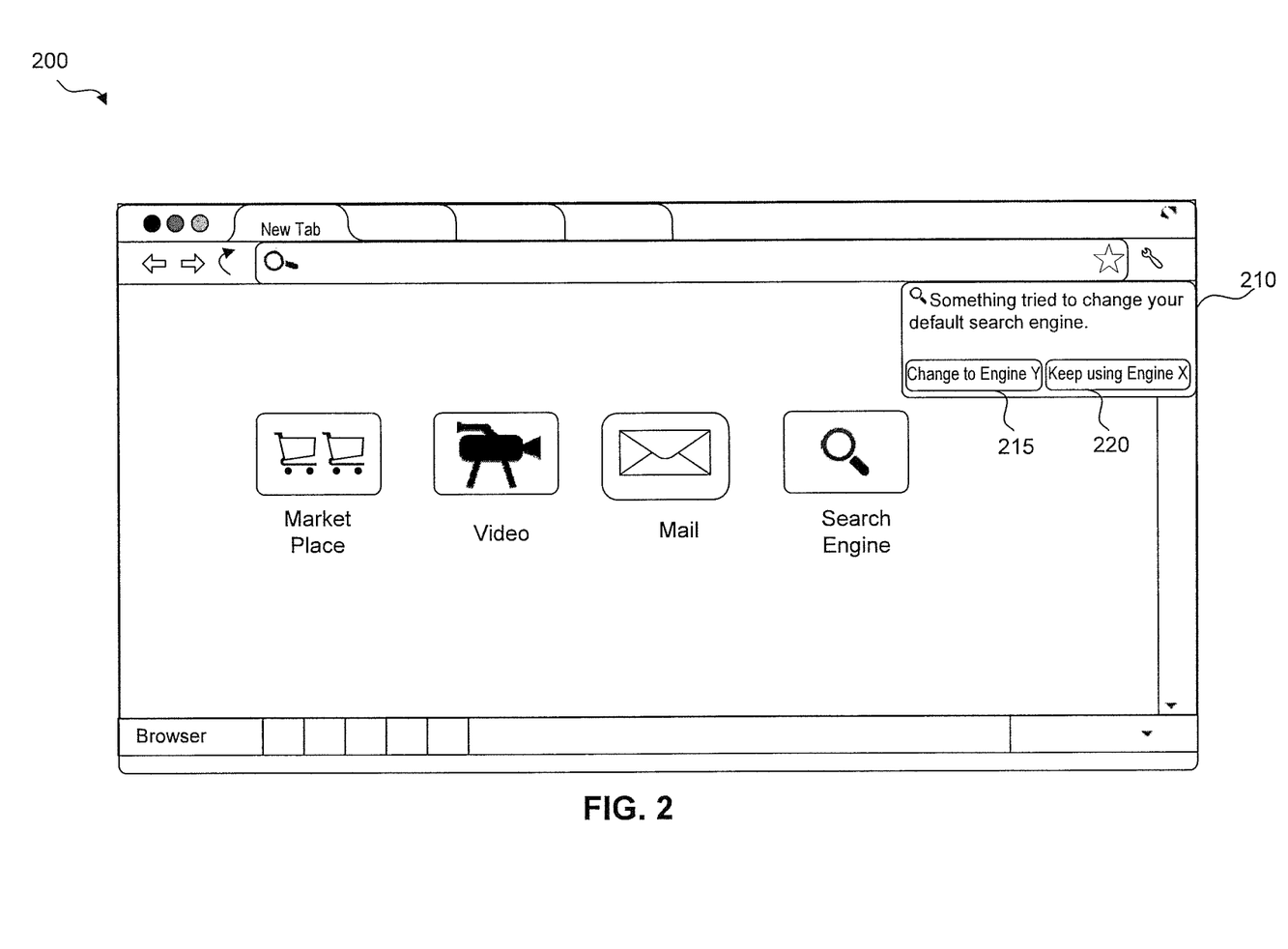
FIG. 2 is an example webpage for displaying an indication to a user of an attempted search engine change, according to an embodiment.

FIG. 2 is an example webpage 200 for displaying an indication to a user of an attempted search engine change, according to an embodiment.

A popup 210 may indicate to the user that an attempt to change the search engine has occurred. Popup 210 states "Something tried to change your default search engine." Client application 116 enables the user to accept or reject the search engine change via web page 200. Option 215 displays a message "Change to Engine Y." The user may select option 215 to accept the application setting change and change the search engine to Engine Y. Option 220 displays a message "Keep using Engine X." The user may select option 220 to reject the application setting change and continue to use Engine X.

In an embodiment, popup 210 is modal. With a modal popup, some specific interaction between the user and the modal popup must occur before the user can continue interacting with the program that activates the modal popup. In this embodiment, the user selects an option before the user may interact with the program.

In another embodiment, popup 210 is non-modal. With a non-modal popup, a specific interaction between the user and the modal popup is not necessary before the user can continue interacting with the program that activates the modal popup. For example, the user may decide to ignore the options (e.g., options 215 or 220) by clicking elsewhere on web page 200. In an example, popup 210 is displayed until a user action occurs. In this example, popup 210 may be displayed regardless of a time period that elapses.

In another example, if the user does not select option 215 or 220 within a given time interval, a default action is to maintain the backup application setting. In an embodiment, update engine 165 determines whether the indication has been displayed for a given time interval. If the indication is determined to have been displayed for the given time interval, update engine 165 may maintain the backup application setting.

Figure 3:
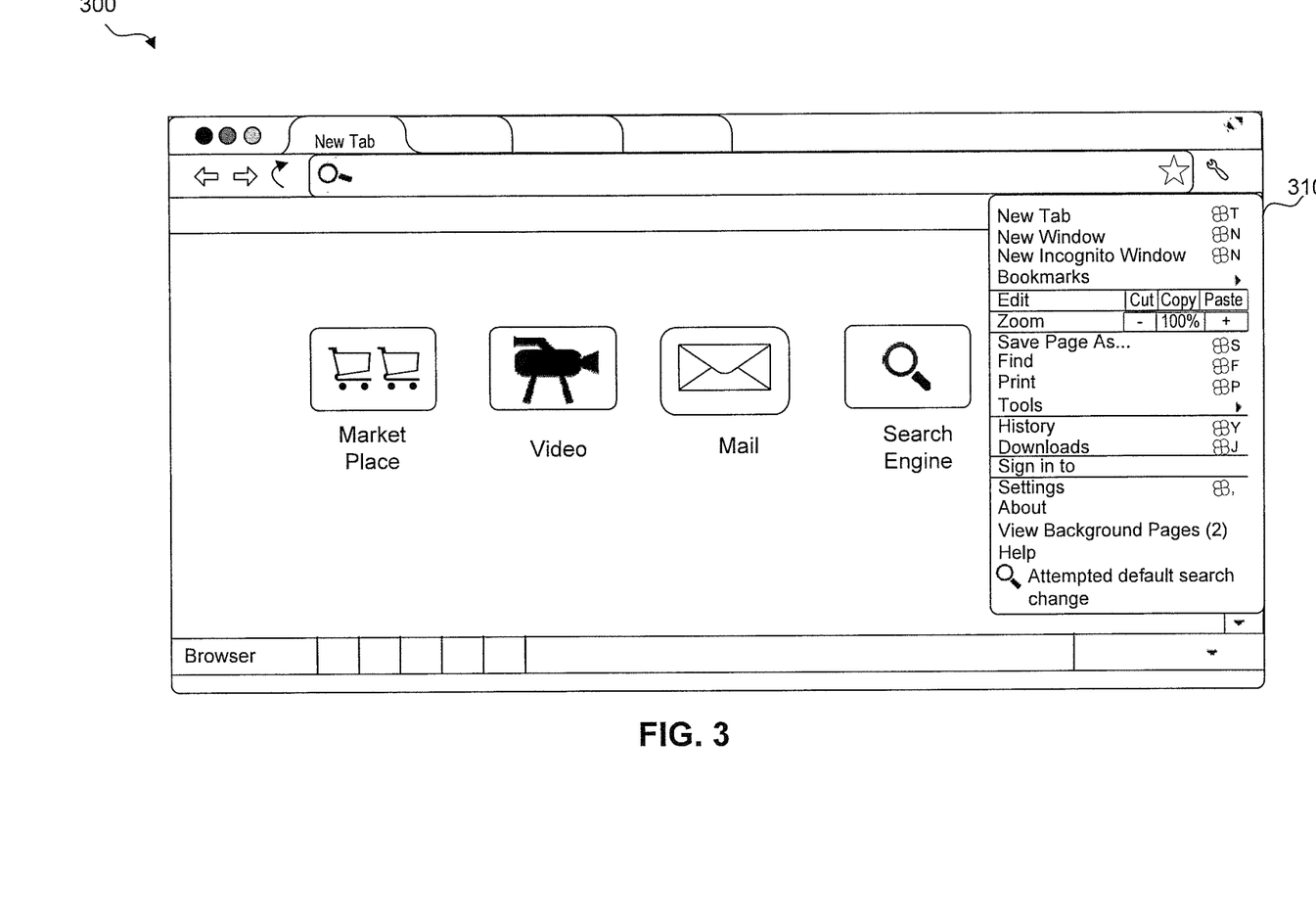
FIG. 3 is an example webpage for displaying a tools menu to the user, according to an embodiment.

In another embodiment, if the user ignores pop-up 210 by, for example, clicking elsewhere, an entry in a tools menu may be displayed. FIG. 3 is an example webpage 300 for displaying a tools menu to the user, according to an embodiment. If the user selects tools menu entry 310, client application 116 may display webpage 200.

If the user does not select tools menu 310 within a given time interval, a default action may be to maintain the backup application setting. For example, the user may ignore tools menu 310 or select (e.g., click) elsewhere on the web page. In an embodiment, update engine 165 determines whether the tools menu has been displayed for a given time interval (e.g., 10 minutes). If the given time interval has elapsed without the user clicking on tools menu 310, the tools menu entry 310 may disappear and update engine 165 may maintain the backup application setting. Accordingly, client application 116 may operate using the backup application setting rather than the provided actual application setting. The actual application setting may also be reset to a backup application setting value.

If several application setting changes are detected sequentially, the pop-ups that indicate the changes may be grouped together. The grouping may be based on the domain part of a specific URL. In an example, the grouping is based on the default search URL, the first startup page URL and the homepage URL, respectively. In this example, if there is a change for the homepage to "www.thisexample.com" and the default search to "thisexample.com/search?q=%s", these two pop-ups may be collapsed into a single entry with text "Keep my settings" and "Change to thisexample.com" pop-ups.

If a new search engine has the same name as the backup search engine, it may be a fraud attempt. Accordingly, options such as "Keep Using X" and "Change to X" may not be displayed because this would be confusing and misleading to a user. Further, an option to switch to the new search engine may not be displayed.

Other messages different from the messages illustrated in FIGS. 2 and 3 may be used to provide an indication to the user of the change (e.g., attempted search engine change). Further, an application setting change different from the attempted default search engine change may be displayed. In an example, if the homepage were changed, an option may be displayed with the text "Change to Homepage Y" that allows the user to accept the homepage change, and another option may be displayed with the text "Keep using Homepage X" that allows the user to reject the homepage change. In another example, if the default search engine and homepage were changed, an option may be displayed with the text "Change to new settings" that allows the user to accept the default search engine and homepage changes, and another option may be displayed with the text "Keep original settings" that allows the user to reject the default search engine and homepage changes.

C. External Tracking Process

In an embodiment, changes to a user application setting may be tracked in a process external to the application. In an example, changes to user application settings may be tracked in a process external to a client application. The external process may read the protected settings periodically in the background, and distinguish changes made by processes internal to the client application and processes external to the client application. To set up the external process, administration or elevation rights may be required from the user.

Figure 4:
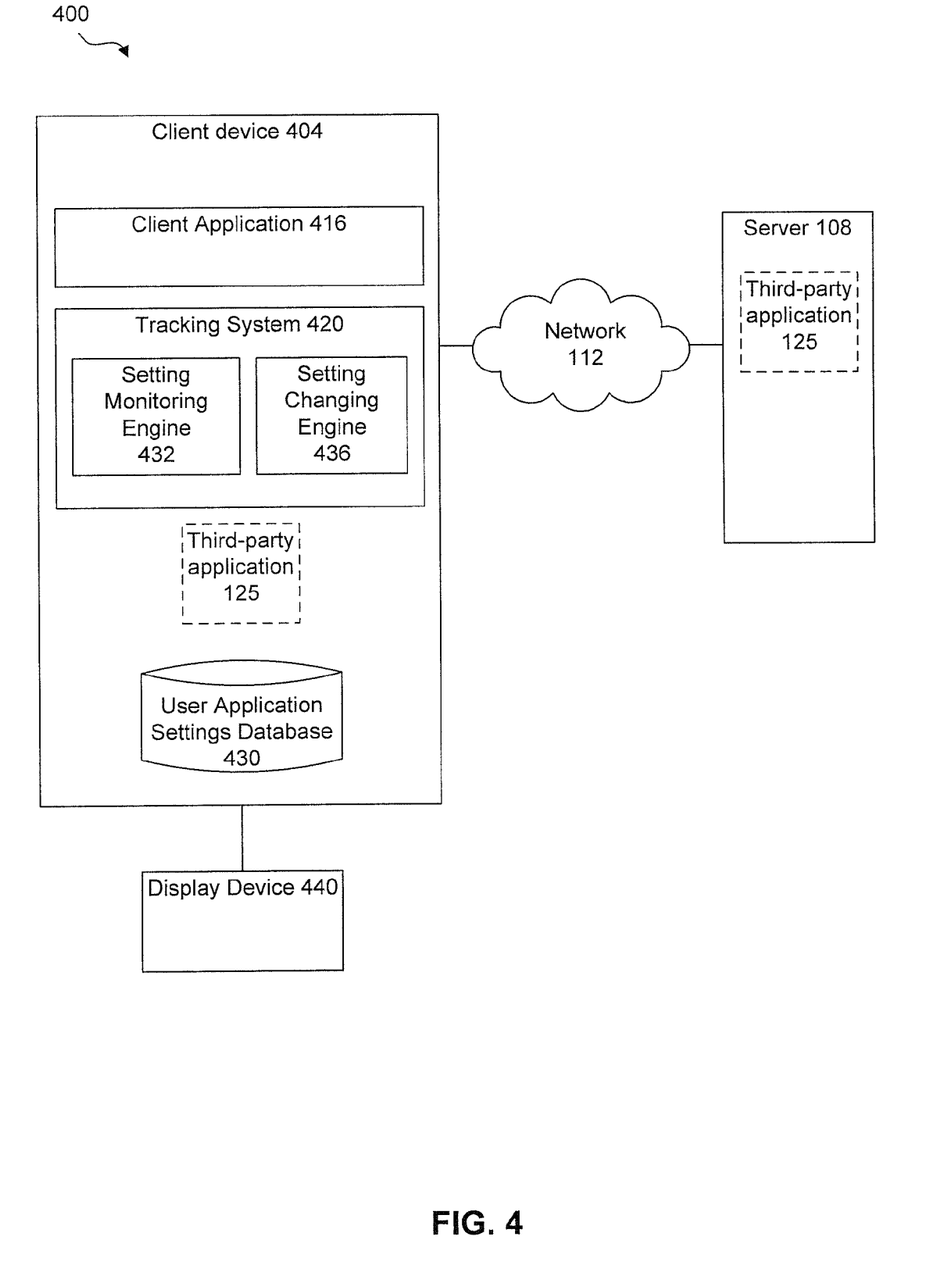
FIG. 4 is a diagram illustrating another system for protecting a user application setting from a third-party application change, according to an embodiment.

FIG. 4 is a diagram illustrating another system 400 for protecting a user application setting from a third-party application change, according to an embodiment.

System 400 includes client device 404 that is communicatively coupled to server 108 via network 112. Client device 404 includes a client application 416, tracking system 420, and user application settings database 430. User application settings database 430 stores one or more user application settings of client application 416. The user application settings may be stored in main memory so that they may be restored while client application 416 is running.

Tracking system 420 may be a permanently resident program on client device 104. In an embodiment, tracking system 420 is run with elevated rights (e.g., administrative user) to prevent tracking system 420 from being stopped by third-party software (e.g., third-party application 125).

Tracking system 420 may detect when approved changes are being made to the user application settings. Tracking system 420 includes a setting monitoring engine 432 and setting changing engine 436.

Setting monitoring engine 432 may monitor one or more user application settings for a change and detect a change to a user application setting based on the monitoring. If a change to a user application setting has been made, setting monitoring engine 432 may determine whether a process internal to the application made the change to the user application setting. If the process that made the change is determined to be internal to the application, setting changing engine 436 may update the user application setting based on the change.

A standalone process may protect one or more user settings of, for example, client application 416 from third-party changes. In an embodiment, a browser helper object (not shown) notifies a standalone protection process when a user manipulates a protected setting, and the standalone process takes note of the event. At a later point in time, the standalone process may be notified by tracking system 420 that the protected setting has changed. If a user action corresponding to the setting change has recently occurred, the standalone process may ignore the setting change.

In an embodiment, the standalone process runs in the background and monitors one or more protected settings of client application 416. A user may change a protected setting through client application 416, and client application 416 may notify the standalone process regarding the user action. The standalone process may be notified by tracking system 420 that the setting has been changed (e.g., through setting monitoring engine 432). If a recent user action to change the setting has been reported from client application 416 to the standalone process, the change may be considered internal to client application 416.

Client application 416 may store user settings on its own. For example, in an embodiment, the standalone protection process may change a protected setting of client application 416. The standalone process may consider all changes external to the standalone process as being performed by a third-party application.

In an embodiment, a standalone process runs in the background and monitors one or more protected settings of client application 416. A user may change a protected setting through client application 416, and client application 416 may instruct the standalone process to change the setting through an inter-process communication (IPC) mechanism. The standalone process may change the setting accordingly. If the monitored setting is changed outside of the standalone process, the change is considered external to client application 416.

Client application 416 displays an indication, via a user interface, that the user application setting has been changed when the process that made the change is determined to not be internal to the application. Client device 404 is coupled to a display device 440. Client application 416 may display the indication via display device 440.

III. Example Process Flow Diagrams

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
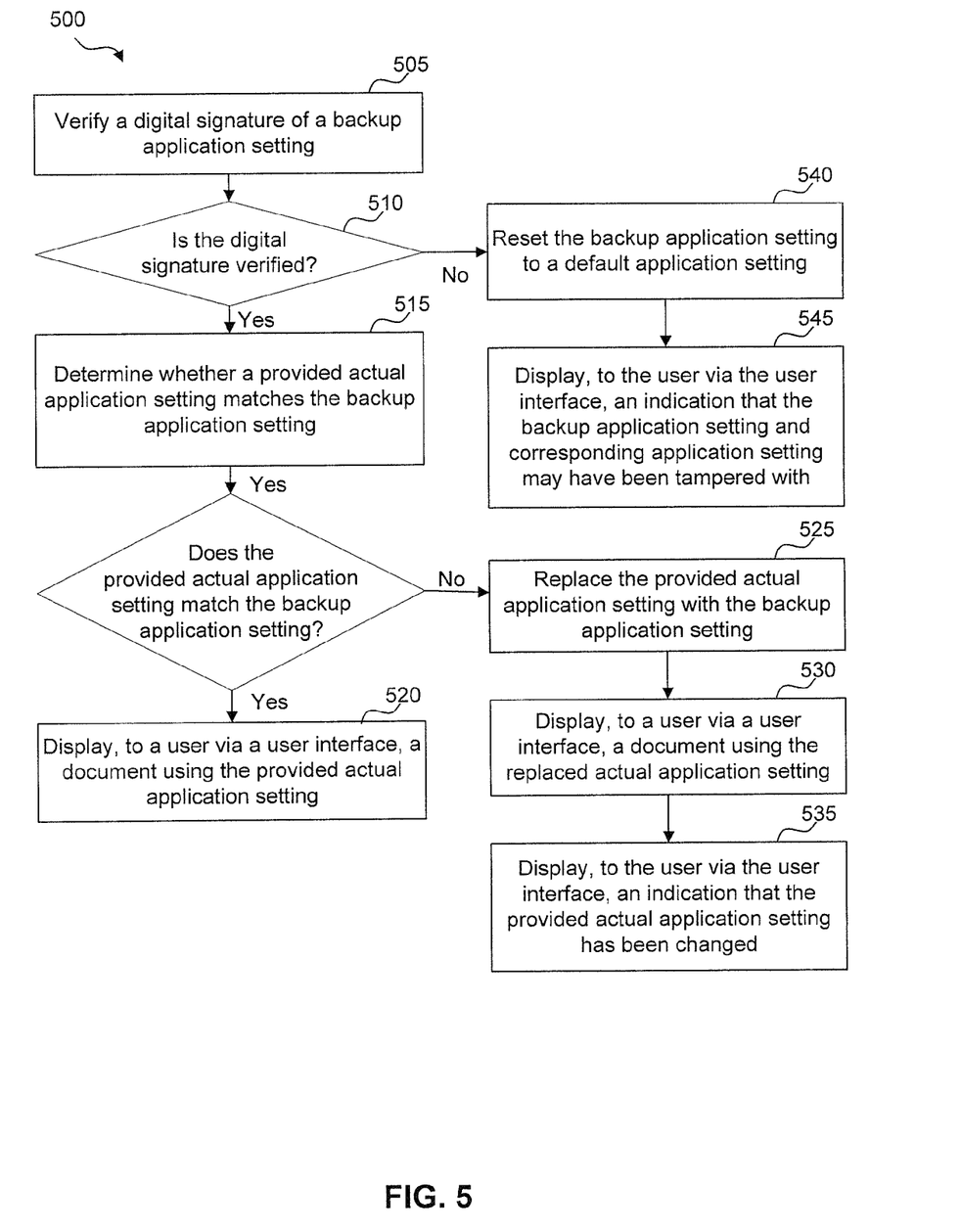
FIG. 5 is an example of a process flow diagram for protecting a user application setting from a third-party application change, according to an embodiment.
Figure 6:
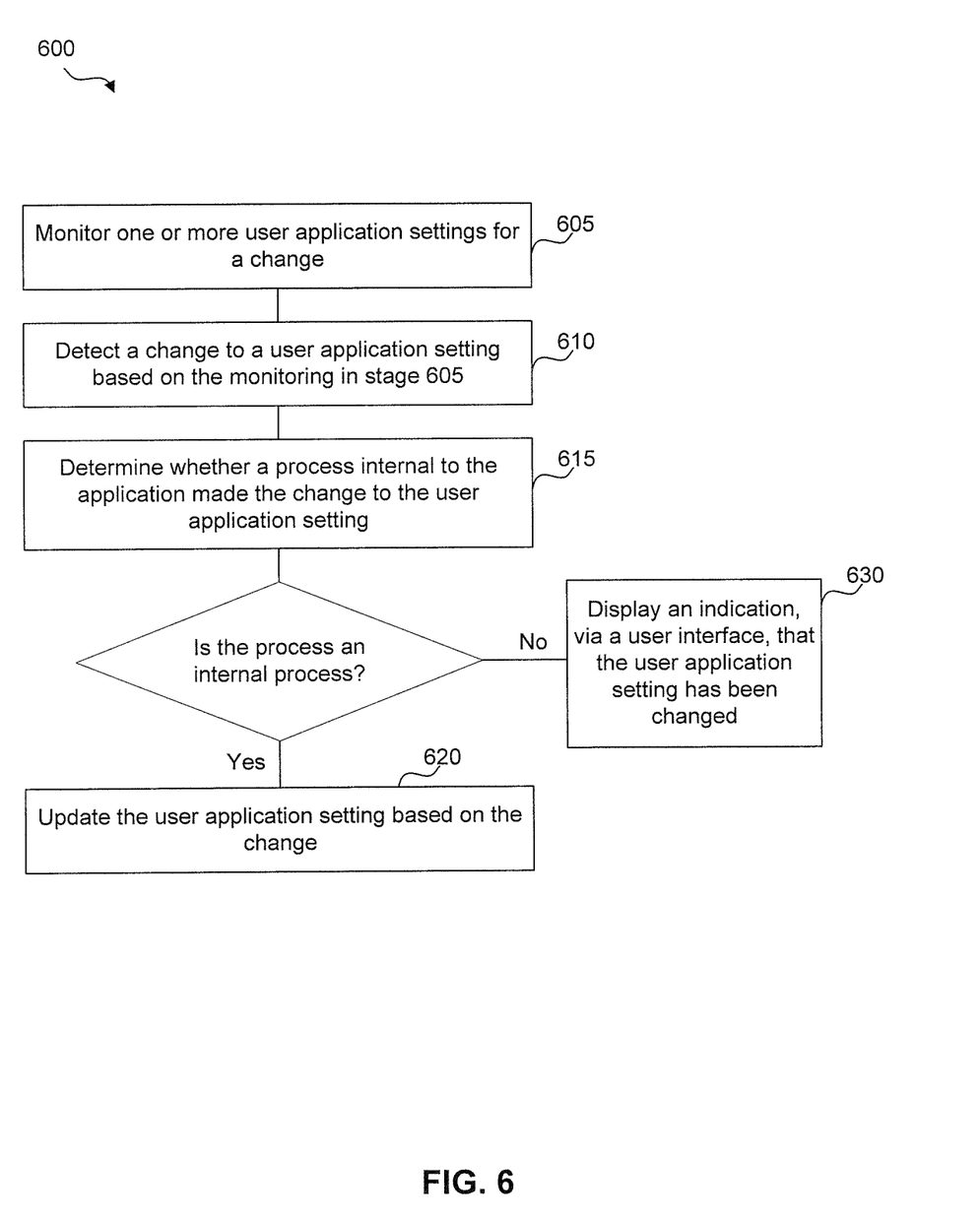
FIG. 6 is an example of another process flow diagram for protecting a user application setting from a third-party application change, according to an embodiment.

FIG. 5 is an example of a process flow diagram 500 for protecting a user application setting from a third-party application change, according to an embodiment. FIG. 6 is another example of a process flow diagram 600 for protecting a user application setting from a third-party application change, according to an embodiment. While methods 500 and 600 are described with respect to embodiments, methods 500 and 600 are not meant to be limiting and may be used in other applications. In the description below, method 500 is described with reference to FIG. 1, and method 600 is described with reference to FIG. 4. Methods 500 and 600, however, are not meant to be limited to these systems.

In FIG. 5, at a stage 505, a digital signature of a backup application setting is verified. In an example, signature verification engine 155 verifies a digital signature of a backup application setting.

At a stage 510, it is determined whether the digital signature of the backup application setting is verified. In an example, signature verification engine 155 determines whether the digital signature of the backup application setting is verified.

At a stage 515, if the digital signature of the backup application setting is verified, it is determined whether a provided actual application setting matches the backup application setting. In an example, settings comparison engine 160 determines whether a provided actual application setting matches the backup application setting.

At a stage 520, if the provided actual application setting is determined to match the backup application setting, a document is displayed, to a user via a user interface, using the provided actual application setting. In an example, if the provided actual application setting is determined to match the backup application setting, client application 116 displays a document, to a user via display device 140, using the provided actual application setting.

At a stage 525, if the provided actual application setting is determined to not match the backup application setting, the provided actual application setting is replaced with the backup application setting. In an example, if the provided actual application setting is determined to not match the backup application setting, update engine 165 replaces the provided actual application setting with the backup application setting.

At a stage 530, a document is displayed, to a user via a user interface, using the replaced actual application setting. In an example, client application 116 displays a document, to a user via display device 140, using the replaced actual application setting.

At a stage 535, an indication is displayed, to the user via the user interface, that the provided actual application setting has been changed. In an example, client application 116 displays an indication, to the user via the user interface, that the provided actual application setting has been changed.

Referring back to stage 510, if the digital signature is not verified, process flow proceeds to a stage 540. At stage 540, the backup application setting is reset to a default application setting. In an example, update engine 165 resets the backup application setting to a default application setting.

At a stage 545, an indication is displayed, to the user via the user interface, that the backup application setting and corresponding application setting may have been tampered with. In an example, client application 116 displays, to the user via the user interface, indication that the backup application setting and corresponding application setting may have been tampered with.

According to an embodiment, stages 505-545 may be performed by components of system 100. In other embodiments, stages 505-545 may be performed by a single module, for example, update engine 165.

In FIG. 6, at a stage 605, one or more user application settings is monitored for a change. In an example, setting monitoring engine 432 monitors one or more user application settings for a change.

At a stage 610, a change to a user application setting is detected based on the monitoring. In an example, setting monitoring engine 432 detects a change to a user application setting based on the monitoring.

At a stage 615, it is determined whether a process internal to the application made the change to the user application setting. In an example, setting monitoring engine 432 determines whether a process internal to the application made the change to the user application setting.

At a stage 620, if the process that made the change is determined to be internal to the application, the user application setting is updated based on the change. In an example, setting changing engine 436 updates the user application setting based on the change when the process that made the change is determined to be internal to the application.

At a stage 630, if the process that made the change is determined to not be internal to the application, and indication is displayed, via a user interface, that the user application setting has been changed. In an example, client application 416 displays an indication, via a user interface, that the user application setting has been changed when the process that made the change is determined to not be internal to the application.

According to an embodiment, stages 605-630 may be performed by components of system 400. In other embodiments, stages 605-630 may be performed by a single module, for example, setting monitoring engine 432.

IV. Example Computer Embodiment

Figure 7:
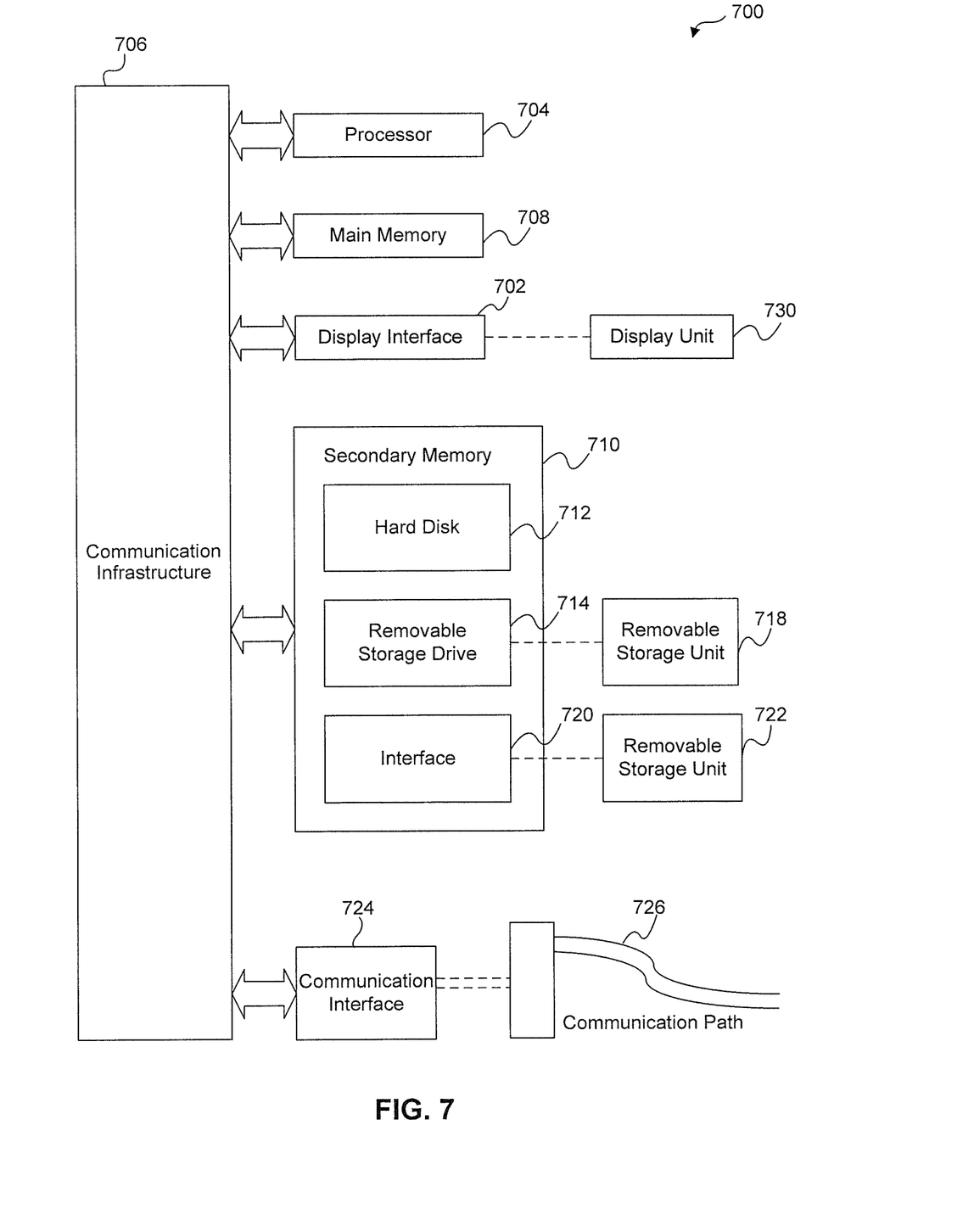
FIG. 7 is a diagram illustrating an example computer system in which embodiments may be implemented as computer-readable code.

In an embodiment, the system and components of embodiments described herein are implemented using one or more computers. For example, settings protection system 120 may be implemented using system 700. In another example, tracking system 420 may be implemented using system 700.

FIG. 7 is a diagram illustrating an example computer system 700 in which embodiments may be implemented as computer-readable code. Hardware, software, or any combination of such may embody any of the modules and components in FIG. 7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 1100. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme. Computer system 700 may also include display interface 702 and display unit 730. Display interface 702 allows results of the computer operations to be displayed to a user or an application developer via display unit 730.

Computer system 700 also includes a main memory 708, for example, random access memory (RAM), and may also include a secondary memory 710. Secondary memory 710 may include, for example, a hard disk drive 712 and a removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, etc. which is read by and written to by removable storage drive 714. As will be appreciated by persons skilled in the relevant art, removable storage unit 718 includes a computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of non-storage signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program storage medium" and "computer readable storage medium" are used to generally refer to media such as removable storage unit 718, removable storage unit 722, and a hard disk installed in hard disk drive 712. Computer program storage medium and computer readable storage medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement embodiments as discussed herein. In particular, the computer programs, when executed, enable processor device 704 to implement the programs, such as the stages in the method illustrated by flowchart 500 of FIG. 5 or flowchart 600 of FIG. 6 discussed above. Accordingly, such computer programs represent controllers of the computer system 700. Where embodiments are implemented using software, the software may be stored in a computer program product and loaded into computer system 700 using removable storage drive 714, interface 720, and hard disk drive 712, or communications interface 724.

Embodiments also may be directed to computer program products including software stored on any computer readable storage medium. Such software, when executed in one or more data processing device, causes a data processing device(s) to operate as described herein. Embodiments employ any computer useable or readable medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all example embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A method for protecting one or more user settings of an application from third-party application changes, comprising:
    verifying a digital signature of a backup application setting;
    determining whether a provided actual application setting matches the backup application setting when the digital signature of the backup application setting is verified;
    replacing the provided actual application setting with the backup application setting when the provided actual application setting is determined to not match the backup application setting;
    displaying to the user via the user interface, a document using the replaced actual application setting; and
    displaying to the user via a user interface, an indication that the provided actual application setting has been changed when the provided actual application setting is determined to not match the backup application setting.

2. The method of claim 1, further comprising:
    identifying an application setting change based on the determining,
    wherein the displaying an indication comprises enabling the user to accept or reject the application setting change.

3. The method of claim 2, wherein the determining whether a provided actual application setting matches the backup application setting comprises:
    reverting the replaced actual application setting to the provided application setting when the user accepts the application setting change;
    updating the backup application setting to the reverted actual application setting;
    generating an updated digital signature for the updated backup application setting;
    storing the updated backup application setting; and
    storing the updated digital signature of the updated backup application setting.

4. The method of claim 3, wherein the generating an updated digital signature comprises generating a Hash-based Message Authentication Code (HMAC) signature.

5. The method of claim 3, wherein the generating an updated digital signature comprises generating the updated digital signature using a secret key.

6. The method of claim 2, further comprising:
    maintaining the backup application setting when the user rejects the application setting change.

7. The method of claim 2, further comprising:
    determining whether the indication has been displayed for a given time interval; and
    maintaining the backup application setting when the indication is determined to have been displayed for the given time interval.

8. The method of claim 1, wherein the verifying a digital signature of a backup application setting comprises:
    identifying the backup application setting in response to a user action;
    generating a new digital signature based on the backup application setting;
    identifying an existing digital signature of the backup application setting; and
    determining whether the existing digital signature matches the new digital signature.

9. The method of claim 8, further including:
    re-setting the backup application setting to a default application when the digital signature of the backup application setting is not verified;
    displaying to the user via the user interface, an indication that the backup application setting and corresponding application setting has been tampered with; and
    enabling the user to accept the default application or to manually restore the backup application setting.

10. The method of claim 1, wherein the application is a web application, and the document is a web page.

11. The method of claim 10, wherein the backup application setting identifies a default search engine.

12. The method of claim 10, wherein the backup application setting identifies a homepage.

13. A system for protecting one or more user settings of an application from third-party application changes, comprising:
    one or more processors;
    a memory coupled to the one or more processors;
    a signature verification engine configured to verify a digital signature of a backup application setting;

a settings comparison engine configured to determine whether a provided actual application setting matches the backup application setting when the digital signature of the backup application setting is verified;

an update engine configured to replace the provided actual application setting with the backup application setting when the settings comparison engine determines that the provided actual application setting does not match the backup application setting; and a display device configured to:
  display, to a user via a user interface, a document using the replaced actual application setting; and
  display, to the user via the user interface, an indication that the provided actual application setting has been changed when the settings comparison engine determines that the provided actual application setting does not match the backup application setting,
  wherein each of the signature verification engine, settings comparison engine, update engine, and display device is implemented on the one or more processors.

14. The system of claim 13, wherein when the settings comparison engine determines that the provided actual application setting does not match the backup application setting, the update engine is configured to identify an application setting change and is further configured to enable the user to accept or reject the application setting change.

15. The system of claim 14, wherein when the settings comparison engine determines whether a provided actual application setting matches the backup application setting, the setting comparison engine is configured to:
  revert the replaced actual application setting to the provided application setting when the user accepts the application setting change,
  update the backup application setting to the reverted actual application setting,
  generate an updated digital signature for the updated backup application setting,
  store the updated backup application setting, and
  store the updated digital signature of the updated backup application setting.

16. The system of claim 14, wherein the update engine is configured to maintain the backup application setting when the user rejects the application setting change.

17. The system of claim 14, wherein the update engine is configured to determine whether the indication has been displayed for a given time interval, and when the update engine determines that the indication has been displayed for the given time interval, the update engine is configured to maintain the backup application setting.

18. The system of claim 13, wherein the application is a web application, and the document is a web page.

19. A non-transitory computer readable storage medium encoded with a computer program, the program comprising instructions that when executed by one or more processors cause the one or more processors to perform operations comprising:
  verifying a digital signature of a backup application setting, the backup application setting comprising a backup copy of a setting of an application;
  determining whether a provided actual application setting matches the backup application setting when the digital signature of the backup application setting is verified, the provided actual application setting comprising a setting of the application provided to the application when the application is launched;
  replacing the provided actual application setting with the backup application setting when the provided actual application setting is determined to not match the backup application setting;
  displaying, to a user via a user interface, a document using the replaced actual application setting; and
  displaying, to the user via the user interface, an indication that the provided actual application setting has been changed when the provided actual application setting is determined to not match the backup application setting.

* * * * *